United States Patent [19]
Pulley et al.

[11] Patent Number: 5,476,734
[45] Date of Patent: Dec. 19, 1995

[54] CURRENT COLLECTOR WITH INTEGRAL TAB FOR HIGH TEMPERATURE CELL

[75] Inventors: Christopher J. Pulley, Shaker Heights; Steven J. Specht, Concord; Geoffrey Barlow, Chagrin Falls, all of Ohio

[73] Assignee: Westinghouse Electric Corporation, Pittsburgh, Pa.

[21] Appl. No.: 234,070

[22] Filed: Apr. 28, 1994

[51] Int. Cl.$^6$ ................................................ H01M 2/20
[52] U.S. Cl. .................. 429/244; 429/242; 429/233; 429/240; 429/123
[58] Field of Search .................. 429/123, 129, 429/161, 162, 158, 157, 170, 131, 136, 143, 144, 142, 233, 240, 242

[56] References Cited

U.S. PATENT DOCUMENTS

| | | | |
|---|---|---|---|
| 1,639,280 | 8/1927 | Benner et al. | 429/233 |
| 4,424,262 | 1/1984 | von Alpen et al. | 429/8 |
| 4,999,262 | 3/1991 | Prince | 429/104 |

*Primary Examiner*—Prince Willis, Jr.
*Assistant Examiner*—M. Nuzzolillo

[57] ABSTRACT

A current collector for use in a cell. The current collector has a thin sheet of conductive material having oppositely directed planar faces. The sheet is preferably graphite. The current collector also has a metal tab having oppositely directed planar faces. A face of the tab is in planar contact with a face of the sheet. The current collector may further have a second thin sheet of conductive material, preferably graphite, having oppositely directed planar faces. The second sheet is placed in planar contact with the tab such that the tab is disposed between the two conductive sheets.

9 Claims, 3 Drawing Sheets

CURRENT COLLECTOR WITH INTEGRAL TAB FOR HIGH TEMPERATURE CELL

BACKGROUND OF THE INVENTION

1. Field of the Invention

This invention relates to improvements in monopolar prismatic cells and more particularly to providing an improved high temperature current collecting medium that is lightweight and corrosion resistant.

2. Description of the Prior Art

Each cell comprises a positive and a negative electrode physically separated from one another by an ionic conductor.

The positive electrode, negative electrode and separator of each cell contains an electrolyte which is liquid at the operating temperature. High temperature rechargeable batteries require a chemically inert, highly conductive current collector for the positive electrode. The positive electrode contains a metal disulfide, typically $FeS_2$, $CoS_2$ or $NiS_2$ or mixtures thereof, which has high sulfur reactivity at the operating temperature of 300° C. to 500° C. and is especially corrosive during recharge. This corrosive environment in the cell limits the material suitable for use in the positive current collector.

If maximum performance is to be realized from an operating battery over an extended period of time, good electrical contact must be maintained at all times between the electrodes and current collection system. Thus, the current collection system should be fabricated from components that retain their physical envelope dimensions when subjected to elevated temperatures.

An additional problem that develops with lithium alloy/metal sulfide high temperature molten salt electrolyte batteries is that due to the nature of the very reactive and highly corrosive compounds they contain, the current collector components must be highly durable and corrosion resistant. The difficult problem in affecting a corrosion resistant current collector system is that the current collector components must also be electrically conductive to an acceptable degree.

Heretofore, metals have usually been considered for the current collectors because of the electrical conductivity requirement. However, alloys typically used in the industry do not meet the corrosion resistance requirement without additional treatment. Refractory metals have been found that meet the corrosion resistance requirement. These refractory metals include molybdenum and tungsten. Refractory metals are relatively costly and are relatively heavy so as to add weight to the cell stack. If some other material is to be used, it will be necessary to coat it with an electrically conductive coating which is highly resistant to attack by the electrode materials or the electrolyte. However, even tiny imperfections (pin holes) in the coating will rapidly result in corrosion of the surrounding casing. Depending on the coating material, it is even possible that the presence of the coating material will accelerate an attack of the surrounding metal in the vicinity of the pin holes, compared to the rate of attack on an uncoated plate.

SUMMARY OF THE INVENTION

We describe a design of an integral current collector and tab which provides uniform current collection from the electrode materials and a low resistance path from the electrode to the terminal via the tab.

The current collector has a thin sheet of conductive material having oppositely directed planar faces. The conductive sheet is preferably made of graphite. The current collector preferably has a tab lying in flat, planar contact with the conductive sheet. The tab is made of a conductive material, preferably molybdenum. The tab is attached to the second sheet by any convenient means that provides adequate conductivity between the tab and the conductive sheet. A preferred means for attaching the tab to the conductive sheet is to pierce the molybdenum tab so that tangs of molybdenum extend outward from the tab. The tab is then brought flush into contact with a planar face of the conductor sheet so that the tangs are forced through the conductive sheet. The tangs are then bent back into contact with the second face of the sheet opposite to the tang.

The current collector may further have a second thin sheet of conductive material, preferably graphite, having oppositely directed planar faces. The third sheet is placed in planar contact with the tab such that the tab is disposed between the first and second conductive sheets. Similarly, the tab may be attached to the second sheet in any convenient, electrically conductive manner. Thus, a molybdenum tab and a graphite sheet are brought together to form a composite current collector, or, alternatively, a molybdenum tab is sandwiched between two thin graphite sheets.

The preferred embodiment of the invention consists of a thin tab of conductive material, preferably molybdenum which extends beyond the edge of a graphite current collector and attaches to a terminal of the battery. The graphite current collector is a thin sheet of graphite. The molybdenum tab is attached to the collector by any convenient means capable of making a low resistance electrical connection. The shape and thickness of the molybdenum foil and the graphite sheet can be varied to achieve the desired resistance and current distribution uniformity. The tab preferably has a handle portion which extends beyond the periphery of the graphite sheet.

Other objects and advantages of the invention will become apparent from a description of certain present preferred embodiments thereof shown in the drawings.

DETAILED DESCRIPTION OF THE PREFERRED EMBODIMENT

Figure 1:
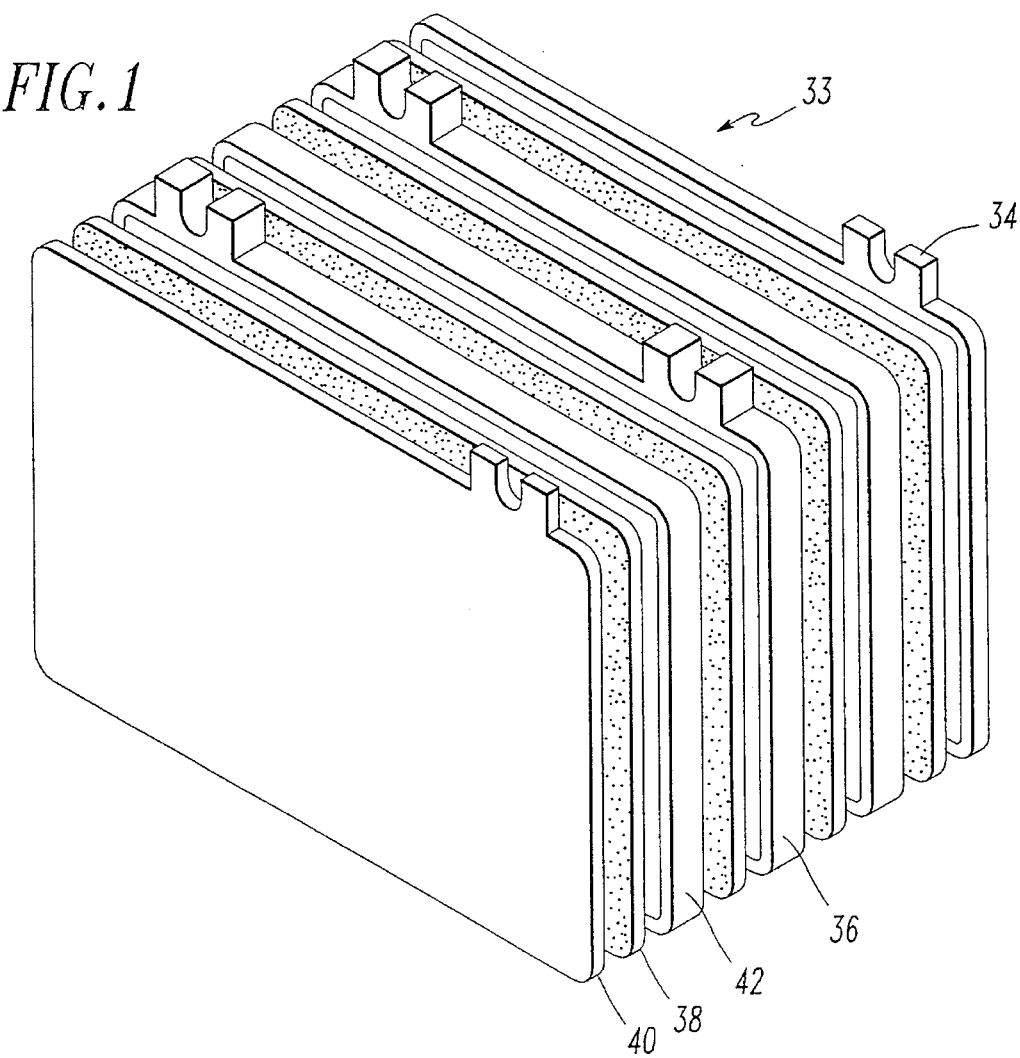
FIG. 1 is an exploded perspective view of a portion of a monopolar multiplate battery cell.

Referring first to FIG. 1, a portion of a monopolar multiplate cell 33 is shown. Such cells 33 are generally known in the industry. A battery is comprised of any number of cells stacked together and elevationally connected in series. The cells 33 include positive electrodes 36 and negative electrodes 42. Typically, although not relevant to the present invention, a separator 38 is provided between the positive and negative electrodes 36, 42 separating them. The positive electrodes 36, negative electrodes 42 and separators 38 of the cells 33 contain an electrolyte which is liquid at the operating temperature.

A cell case or housing (not shown) contains positive and negative current collectors 34, 40 and the positive and negative electrodes 36, 42. The current collectors of the present invention may be seen in FIG. 1. The current collectors are provided within the battery case between the electrodes. Thus, the positive current collectors 34 shown in the embodiment of FIG. 1 are each provided between two adjacent positive electrodes 36. Similarly, the negative current collectors 40 are each provided between two adjacent negative electrodes 42. A separator 38 is provided between positive and negative electrodes 36, 42. The positive battery terminal (not shown) is preferably connected to the positive current collectors 34 and extends out of the cell case. Similarly, the negative battery terminal (not shown) is preferably connected to the negative current collectors 40.

Figure 2:
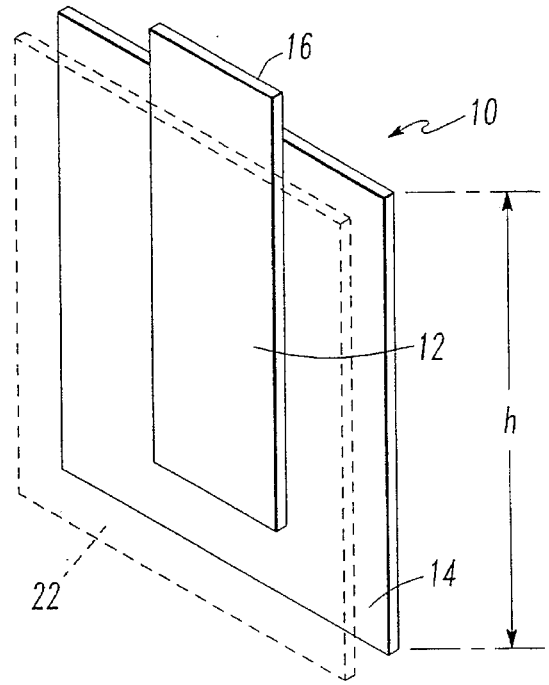
FIG. 2 is an elevation view of a preferred current collector.
Figure 3:
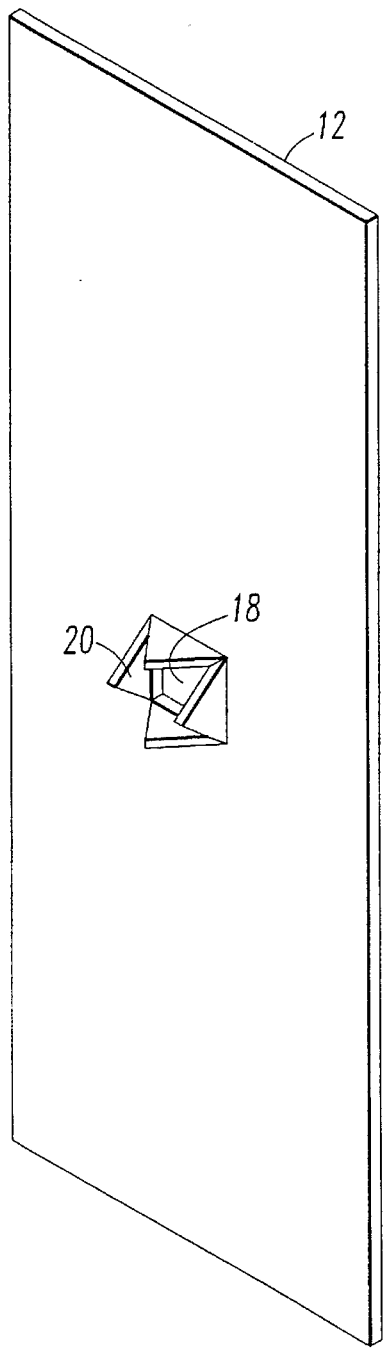
FIG. 3 is a perspective view of a first preferred tab used in the preferred current collector.

FIGS. 2 and 3 show the preferred embodiment of the current collector 10. The preferred current collector 10 is comprised of a tab 12 of conductive material, such as metal and preferably molybdenum, fixed to a graphite collector sheet 14. A connector (handle-like) portion 16 of the tab 12 extends beyond the periphery of the conductive graphite current collector sheet 14 and attaches to the cell terminal (not shown). The tab 12 extends along the direction of the height of the graphite sheet (depicted as "h" in FIG. 2), bisecting the collector sheet 14. The tab 12 may extend downward in the direction of the height of the graphite collector plate 14 any selected amount.

The preferred molybdenum foil sheet comprising the tab 12 is approximately 0.005 inches thick and approximately 0.5 inches in width and runs the height of the graphite current collector 14. The graphite current collector sheet 14 is preferably a thin sheet of graphite foil. The graphite collector sheet 14 is formed from a 0.016 inch thick sheet of flexible graphite. Note that these dimensions are typical but are optimized depending on the battery application, i.e., higher the operating rate the greater the cross-sectional area required.

As shown in FIG. 3, a molybdenum tab 12 is preferably pierced to create a plurality of perforations 18 thereupon (for clarity only one perforation is shown in FIG. 3). The piercing of the tab 12 results in pointed tangs 20 being formed around each perforation 18. The tangs 20 are forced through the graphite collector sheet 14. The molybdenum tab 12 is preferably pierced with a pointed punch so that the edges of the pierced perforations 18 have sharp edges (tangs) 20 of the foil protruding outward from one face of the tab 12. The face of the tab 12 with the protruding tangs 20 is pressed into the graphite collector sheet 14. The pressing operation attaches the tab 12 to the graphite collector sheet 14 and makes a low resistance electrical connection. Sufficient pressure is applied to push the sharp edges or tangs 20 of the pierced molybdenum tab 12 through one face of the graphite collector sheet 14 and to bend them over onto the opposed face of the collector sheet 14, pressing the thickness of the molybdenum tab 12 into the graphite sheet 14 by compressing the flexible graphite sheet 14 to form smooth surfaces on both faces of the finished current collector 10. These flat surfaces are required for low resistance contact between the positive electrode and the current collector. The pressing is typically accomplished between flat, ground steel plates in a hydraulic press. The shape and thickness of the molybdenum foil tab 12 and the graphite collector sheet 14 can be varied to achieve the desired resistance and current distribution uniformity.

Such sheets of flexible graphite which make a suitable graphite current collector sheet 14 include Grafoil™ or Flexigraph™. The current collector material must be corrosion resistant and electrically conductive. Tests indicate that the graphite does not react extensively with any other material present in the cells.

Common metals, at ambient temperature, have resistivities from around 0.01 to 0.1 μΩ·m. At battery operating temperatures, the values of these resistivities are a factor of two to five times higher. The least expensive metal, low carbon steel, has a resistivity of about 0.5 μΩ·m at 500° C. The actual difference in performance will also depend on the thickness of the material used. Thin sheet carbon may be less expensive than metals of equivalent thickness.

Sheets of flexible graphite such as Union Carbide's Grafoil™ may be used as the current collectors. The resistivity of Grafoil™ differs between the in plane direction and the through thickness direction. Through the thickness of the Grafoil™ sheet, the resistivity is on the order of 1 Ω·m (the values of the resistivity of Grafoil™ vary slightly with temperature). The resistivity may be reduced by applying pressure to the sheet, but a considerable pressure, in excess of 500 kPa, is required to reduce the resistivity significantly. In contrast, the resistivity in the plane of the Grafoil™ sheet is much lower (on the order of 8 μΩ·m).

In addition to utilizing commercially available flexible graphite, carbon current collector sheets 14 may be produced by other means. One way to produce a current collector sheet 14 having acceptable conductivity is to apply a high compressible force to a sheet of graphite. A compressive force of around $3.45 \times 10^5$ kPa produces sufficient conductivity. A sheet of approximately 0.5 mm is preferred.

The preferred collectors with integral tabs have been incorporated into cells having lithium aluminum negative electrodes, molten salt electrolyte, magnesium oxide separators and iron disulfide positive electrodes. The cells were charged and discharged while at the operating temperature of 410° C. Electrical performance of the cell was similar to cells with alternative current collectors made of molybdenum.

Alternatively, the metal tab could be laminated between two sheets of graphite. A second graphite sheet 22 is shown in dotted line in FIG. 2. The tab 12 may be affixed to both collector sheets 14, 22 by having tangs 20 provided on both opposed faces of the metal tab 12.

Figure 4:
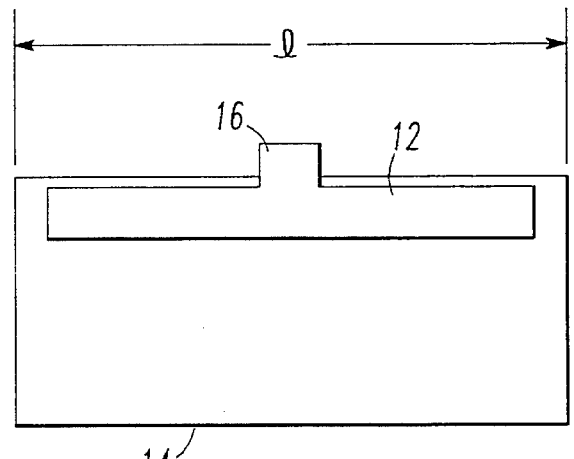
FIG. 4 is an elevational view of a second preferred tab.

Referring next to FIGS. 4 through 8, alternative embodiments of the present invention are shown. As shown in FIG. 4, the metal tab 12 need not extend along the direction of the height of the graphite current collector sheet 14, bisecting that collector sheet 14. But rather, the tab 12 may extend along the direction of the length of the graphite sheet 14 (depicted as "l" in FIG. 4). The tab 12 may extend across in the direction of the length of the collector sheet 14 any selected amount.

Figure 5:
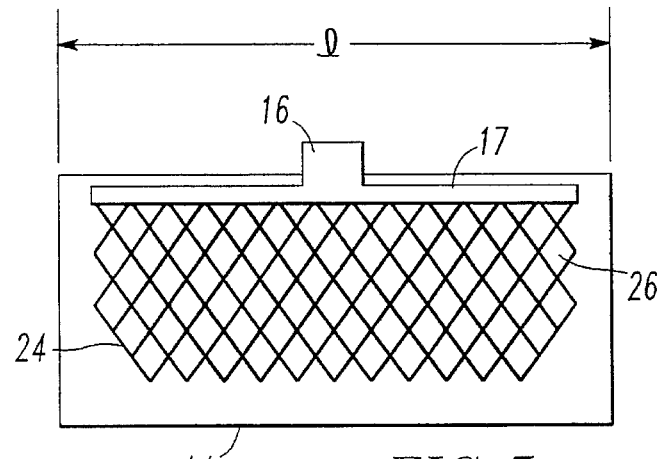
FIG. 5 is an elevational view of a third preferred tab.

As can be seen in FIG. 5, the tab 12 may be comprised of an expanded metal foil mesh portion 24 connected to a solid metal or metal foil mesh handle portion 16. The handle portion 16 may have a solid extending portion 17 which is provided along the entire length of the tab 12, or may connect directly to the mesh portion 24. The expanded metal foil mesh may extend over all or part of the current collector sheet 14. The expanded mesh has a plurality of openings 26 provided thereon. The openings 26 may be any selected size so that the openings 26 may constitute any selected area of the tab 12. The metal foil mesh may be pressed into one current collector sheet surface 14 or may be laminated between two sheets (not shown).

Figure 6:
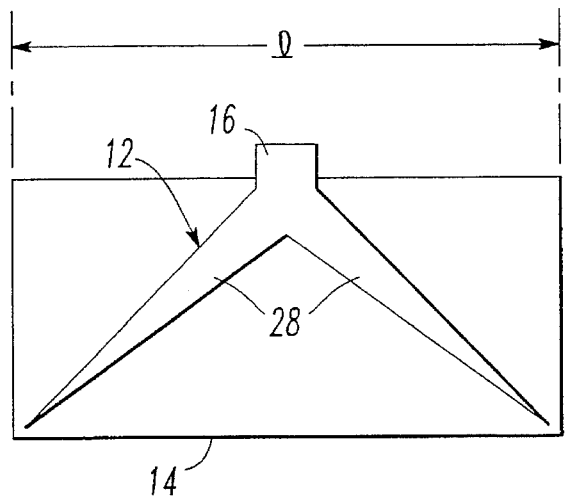
FIG. 6 is an elevational view of a fourth preferred tab.

As can be seen in FIG. 6, the tab 12 may be any selected shape. The tab 12 preferably has a handle portion 16 which extends outward beyond the periphery of the current collector sheet 14 and attaches to the battery terminal (not shown). The remainder of the tab 12 extends as two prongs 28 which extend at any selected angle relative to one another. Furthermore, the prongs 28 may be any selected length.

Figure 7:
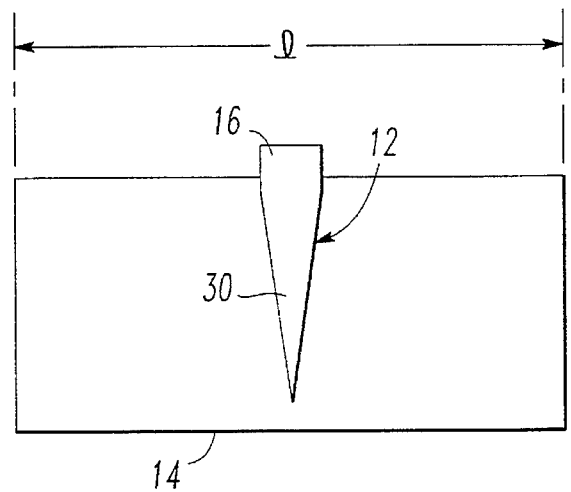
FIG. 7 is an elevational view of a fifth preferred tab.

Alternatively, as shown in FIG. 7, the tab 12 may have one prong 30 that is tapered and extends downward from the handle portion 16 of the tab 12. Again, the prong 30 may be any selected length and may extend in the direction of the height of the collector sheet or at any angle thereto. Furthermore, the taper of the prong 30 may be at any selected angle.

Figure 8:
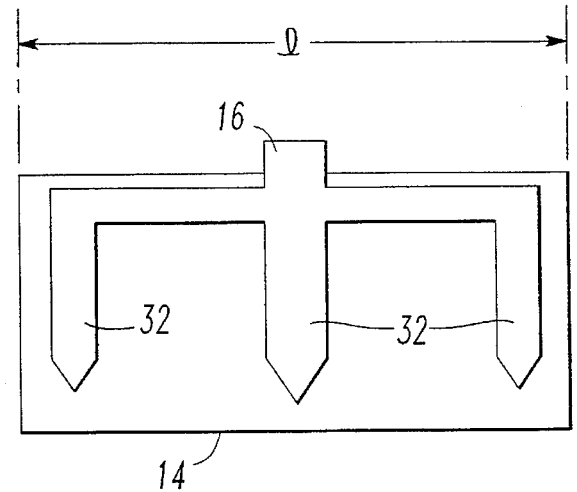
FIG. 8 is an elevational view of a sixth preferred tab.

FIG. 8 shows a tab 12 having handle portion 16 and a plurality of prongs extending therefrom. Shown are three equally spaced prongs 32 that preferably extend in an essentially parallel fashion relative to one another in the direction of the height of the collector sheet 14. The prongs 32 may be any selected length and may be any relative distance apart from one another. Furthermore, the prongs 32 need not be parallel to one another but may extend at selected angles relative to one another.

Variations of the preferred embodiments could be made. For example, the metal tab 12 could be flat without piercing or could be drawn into expanded sheet and pressed could be bonded to the graphite provided the adhesive is conductive at the battery operating temperature. Furthermore, in any of the embodiments depicting tabs having multiple prongs, any number of prongs may be used, with the prongs being in any orientation having any length. Also, although the tabs and prongs of the tabs have as an example been shown as being straight, they may alternatively be curved, angular or have any preferred shape. And, the tabs or prongs or handle portions of the tabs need not extend along the center of the graphite sheet or sheets but may be placed along any location along the graphite sheet.

Although the present design has been incorporated in high temperature cells having specific material compositions, the present design may be incorporated in other high temperature cells with solid electrodes which use other active materials.

While certain present preferred embodiments have been shown and described, it is distinctly understood that the invention is not limited thereto but may be otherwise embodied within the scope of the following claims.

We claim:

1. A current collector for use in a cell, the current collector comprising:

a sheet of conductive material having oppositely directed planar faces;

a tab of conductive material having oppositely directed planar faces, wherein the tab is in planar contact with the conductive sheet; and wherein the tab having oppositely directed planar faces and having at least one tang extending outward from a face thereof, and wherein the tab is attached to the conductive sheet by having the tab being placed into contact with one face of the conductive sheet and disposing at least one tang through said conductive sheet and then pressing the tang back into contact with an opposite face of the conductive sheet.

2. A current collector for use in a cell, the current collector comprising:

a sheet of conductive material having oppositely directed planar faces;

a tab of conductive material having oppositely directed planar faces, wherein the tab is in planar contact with the conductive sheet; and wherein selected portions of said tab are fabricated of expanded metal foil mesh.

3. A current collector for use in a cell, the current collector comprising:

a sheet of conductive material having oppositely directed planar faces;

a tab of conductive material having oppositely directed planar faces, wherein the tab is in planar contact with the conductive sheet; and a second sheet of conductive material having oppositely directly planar faces, wherein the second sheet is in planar contact with a face of the tab, such that the tab is disposed between the two conductive sheets.

4. The current collector of claim 3 wherein the second sheet of conductive material is fabricated of graphite.

5. The current collector of claim 3 wherein the tab is attached to the second conductive sheet by having at least one tang extending outward from a face of the tab, the tab is placed into contact with one face of the second conductive sheet and the at least one tang is disposed through said second sheet and pressed back into contact with an opposite face of the second sheet.

6. The current collector of claim 3 wherein the tab has a connector portion extending beyond a periphery of the thin sheets.

7. The current collector of claim 3 wherein a portion of said tab in planar contact with and disposed between the two conductive sheets is fabricated of expanded metal foil mesh.

8. The current collector of claim 3 wherein the tab has a least one prong portion in planar contact with the conductive sheet.

9. A current collector for use in a cell, the current collector comprising:

a sheet of graphite having oppositely directed planar faces; and a tab of molybdenum having oppositely directed planar faces, and having at least one tang extending outward from a face thereof, wherein one face of the molybdenum is in planar contact with a face of the graphite sheet, and wherein at least one tang is disposed through said graphite sheet and is in flat contact with an opposite face of the graphite sheet.

* * * * *